US008811467B2

(12) United States Patent
Vierinen

(10) Patent No.: US 8,811,467 B2
(45) Date of Patent: Aug. 19, 2014

(54) METHODS AND ARRANGEMENTS FOR EMPLOYING CODED TRANSMISSIONS

(75) Inventor: Juha Vierinen, Sodankylä (FI)

(73) Assignee: Fracticode Ltd., Helsinki (FI)

( * ) Notice: Subject to any disclaimer, the term of this patent is extended or adjusted under 35 U.S.C. 154(b) by 667 days.

(21) Appl. No.: 12/824,629

(22) Filed: Jun. 28, 2010

(65) Prior Publication Data

US 2011/0317782 A1 Dec. 29, 2011

(51) Int. Cl.
 *H03K 7/08* (2006.01)
(52) U.S. Cl.
 USPC ............... 375/238; 341/53; 341/67; 341/95; 341/178; 341/182; 341/183; 375/239; 375/246; 375/253; 342/137
(58) Field of Classification Search
 CPC ...... G01S 13/288; G01S 13/951; G01S 13/28; G01S 13/106; H04J 13/10; H04J 13/0003; H03K 5/00006; H03K 5/05; H03K 7/08; H03K 7/10
 USPC ........... 375/295, 219, 238–239, 246, 253, 39; 341/50, 53, 95, 182, 183, 54, 64, 67, 341/177, 179, 185, 178; 342/137
 See application file for complete search history.

(56) References Cited

U.S. PATENT DOCUMENTS

| | | | | | |
|---|---|---|---|---|---|
| 4,524,335 | A | * | 6/1985 | Yokoyama | 332/110 |
| 5,321,409 | A | * | 6/1994 | Walker | 342/202 |
| 5,986,602 | A | * | 11/1999 | Frink | 342/126 |
| 6,359,525 | B1 | * | 3/2002 | Mohan et al. | 332/108 |
| 6,463,104 | B1 | * | 10/2002 | Dirr | 375/259 |
| 2005/0063708 | A1 | * | 3/2005 | Melick et al. | 398/141 |
| 2006/0045177 | A1 | * | 3/2006 | Kurashima et al. | 375/239 |
| 2009/0009385 | A1 | * | 1/2009 | Lehtinen | 342/196 |

OTHER PUBLICATIONS

Vierinen et al. "Amplitude domain inversion of narrow radar targets", Aug. 15, 2008, Sondakyla Geophysical Observatory.*
Vierinen Juha, Lehtinen Markku: "Sodankylä Geophysical Observatory, Finland"—Aug. 15, 2008—27 pages (XP002663597).
Vierinen Juha: "Sodankylä Geophysical Observatory, Finland"—Nov. 21, 2008—31 pages (XP002663598).
Virtanen I. et al.: "Phase-coded pulse aperiodic transmitter coding"—Annales Geophysicae European Geophysical Society Germany, vol. 27, No. 7, Jan. 1, 2009, pp. 186-198 (XP002663599).
PCT Notification of Transmittal of the International Search Report and the Written Opinion of the International Searching Authority issued in connection with corresponding PCT/FI2011/050613.

* cited by examiner

*Primary Examiner* — Sophia Vlahos
(74) *Attorney, Agent, or Firm* — Wood, Phillips, Katz, Clark & Mortimer

(57) ABSTRACT

A finite sequence of code values is formed, and can be used for example in communications or remote sensing. A code value in said finite sequence of code values has a validity period specific to that code value. There are code values of different validity periods in said finite sequence of code values. Each of said validity periods is longer than or equal to a predetermined minimum baud length.

1 Claim, 7 Drawing Sheets

METHODS AND ARRANGEMENTS FOR EMPLOYING CODED TRANSMISSIONS

TECHNICAL FIELD

The invention concerns generally the use of a coded electromagnetic signal for the purpose of conveying information between a transmitter and a receiver. In particular the invention concerns the use of codes that have good inverse filter properties despite the limitations set to minimum baud length.

BACKGROUND OF THE INVENTION

There are various reasons for applying a code to an electromagnetic signal to be transmitted. In many cases the reasons have to do with the fact that an appropriate receiving party who knows the code—but only that party—can retrieve information from the received signal better than if no code was applied.

FIG. 1 illustrates a communications application, in which a transmitter 101 generates a time-discrete signal S=s(t) to be transmitted to the receiver 111. The transmission will take place through a transmission channel, where effects like interference, attenuation, fading and multipath propagation will cause distortions. Additionally it may be desirable to keep unauthorised third parties from receiving the signal. In order to compensate for distorting effects and/or to make unauthorised reception difficult, an encoding unit 102 of the transmitter 101 employs a code C to produce an encoded signal C(S). A decoding unit 112 of the receiver employs an inverse code C−1 to cancel the effect of coding, so that as a result the original signal S is produced. In many cases of digital coding the inverse is the same as the original code, i.e. C−1=C, or a time inverse of the original code, i.e. C−1(t)=C(−t).

FIG. 2 illustrates a remote sensing application, in which the purpose is to detect some features of a target 221 by using a transmitter 201 to transmit electromagnetic radiation towards the target 221 and a receiver 211 to receive a reflected or scattered signal from the target 221.

From the viewpoint of signal generation there are significant differences between communication and remote sensing applications. In communications, the contents of the original signal to be transmitted cannot be predicted beforehand: the original payload signal may resemble a random bit stream, the contents of which the receiving device should find out without prior knowledge. In some cases some prior knowledge can be applied; for example, if the original transmission is known to be text on a particular language, the typical occurrence frequency of characters and/or words in that language could be used. The coded transmission signal is produced as a convolution of said apparently random bit stream with the known form of the code.

In remote sensing applications the original signal to be transmitted is essentially only the code C, the form of which is a priori known to both the transmitter 201 and the receiver 211. The unknown information which the receiving device should retrieve is ultimately the spatial (and, in some cases, temporal) distribution of some characteristic of interest in the target 221, which manifests itself through some measurable interaction with the transmitted electromagnetic radiation. What arrives at the receiver 211 is the result of the transmitted code C interacting with the target characteristics distribution S. It can be thought of as a convolution C*S, from which the receiver should retrieve S by applying its knowledge about C. Later in this description we show that incoherent scattering from the target requires more detailed analysis.

For example in many radar applications the target 221 is actually a distribution of reflectivity values at different distances. Range resolution could be enhanced by only transmitting a very short radar pulse and by observing the arrival of echoes from different distances. This would lead to uneconomical use of the radar duty cycle and decrease the mean received power. A better solution in a simple case is to use a coding filter (or code generator) 202 in the transmitter and a corresponding decoding filter 212 in the receiver to apply a phase-modulated pulse code to the transmitted radar signal and to derive the distribution of reflectivity values as a function of distance by convolving the received signal with the impulse response of a suitable reception filter. In more complicated cases, for example if in the detection of fast moving targets that do not have constant Doppler shift, the trajectory of the target must be estimated in addition to its range. In those cases a maximum likelihood estimated can be formulated on the basis of e.g. a grid search or a gradient search. Matrix formulae exist for processing the amplitude results of incoherently scattering targets. In addition to or in place of phase modulation, also other modulation principles like amplitude or frequency modulation could be used.

An important similarity in communication and remote sensing applications is the reliance on the orthogonal properties of the code. In communications, random noise and simultaneous other transmissions coded with different codes will not correlate with the coded form of the transmission signal, so the inverse coding (i.e. decoding) operation at the receiver will cause them to cancel out. In remote sensing, interactions of the same coded transmission signal with different parts of the target (e.g. reflectivity at a different range) will similarly cancel out due to code orthogonality, if the differently received versions of the code can be separated sufficiently well in the received composite signal.

The goodness of a code for purposes like those illustrated above can be measured in multiple ways. As an example of using the autocorrelation properties of the code, let us consider the so-called Barker codes originally introduced in Barker, R. H.: "Group Synchronizing of Binary Digital Systems", in: Communications Theory, edited by Jackson, W. Academic Press, New York, 273-287, 1953. Known Barker codes are finite bit sequences that have been shown to be the most efficient binary codes using single code sequences. The autocorrelation function of each Barker code has a central peak and a number of sidelobes on each side of it. The peak-to-sidelobe ratio equals the length of the Barker code in bits.

The use of a matched filter is a known technique for receiving coded transmissions. A matched filter is one that maximises the output signal-to-noise ratio in the presence of additive stochastic noise. The matched filter that corresponds to a known binary code has an impulse response that is a time-reversed and conjugated version of the transmitted coded signal. In digital signal processing the use of a matched filter has the advantages that the filter has a finite length and filtering is readily implemented with a number of logical operations; on the other hand the effect of sidelobes in the autocorrelation function just has to be accepted.

A patent publication number US 2010/0109929 A1 discloses so-called perfect codes, which have the characteristic that if the code has sufficiently many elements, the values of which can be selected from a number spaces larger than just binary values, the code can be made to have arbitrarily small sidelobes in its autocorrelation function.

A technique known as mismatched filtering has been described in publications like Lüke, H. D.: "Mismatched filtering of periodic quadriphase and 8-phase sequences", IEEE Transactions on Communications, Vol. 51, No. 7, July 2003, and Damtie, B., Lehtinen, M., Orispää, M., Vierinen, J.: "Mismatched filtering of aperiodic quadriphase codes", IEEE Transactions on Information Theory 54 (2008), no. 4, 1742-1749. The convolution of the impulse response of the mismatched filter with the transmission code produces a weight function with no sidelobes. A mismatched filter can be calculated for practically any code, with the merely theoretical exception that the Fourier transform of the code must not have any zeroes. Another merely theoretical drawback of mismatched filters is that the impulse response of a properly calculated mismatched filter has an infinite number of non-zero elements. A yet another drawback of mismatched filters is that they do not achieve the optimal signal-to-noise ratio (SNR) of matched filters.

Despite of the many advantages of code design, mismatched filtering, and other approaches, there remains the need for codes that would be practical to use in a variety of applications based on electromagnetic transmissions, and that would have reasonably good autocorrelation properties.

SUMMARY OF THE INVENTION

An objective of the present invention is to present codes for digital signal processing that would enable minimizing the errors in interpreting the received signal. Another objective of the invention is to present devices for communication and remote sensing that are capable of utilising such codes.

The objectives of the invention are achieved by employing codes that have a variable baud length.

An electronic device for outputting a finite sequence of code values according to the invention is characterised in that
  a code value in said finite sequence of code values has a validity period specific to that code value,
  there are code values of different validity periods in said finite sequence of code values, and
  each of said validity periods is longer than or equal to a predetermined minimum baud length.

A communication device adapted to implement coded communications with at least one other communication device according to the invention is characterized in that it comprises an electronic device of the kind described above.

A remote sensing device adapted to transmit a coded transmission signal towards a target according to the invention is characterized in that it comprises an electronic device of the kind described above.

A method for transmitting an encoded signal, a method for receiving and decoding an encoded signal, and a method for remotely sensing a target according to the invention are all characterised by the use of a finite sequence of code values, wherein a code value in said finite sequence of code values has a validity period specific to that code value, there are code values of different validity periods in said finite sequence of code values, and each of said validity periods is longer than or equal to a predetermined minimum baud length.

A method for generating a code according to the invention is characterized in that it comprises:
  defining a finite sequence of code values
  for each code value in said finite sequence of code values, defining a validity period specific to that code value,
  selecting different validity periods for different code values in said finite sequence of code values, and
  selecting for code values in said finite sequence of code values only validity periods that are longer than or equal to a predetermined minimum baud length.

A computer program product according to the invention is characterized in that it comprises machine-readable instructions that, when executed on a computer, cause the computer to implement outputting a finite sequence of code values, wherein: a code value in said finite sequence of code values has a validity period specific to that code value; there are code values of different validity periods in said finite sequence of code values, and each of said validity periods is longer than or equal to a predetermined minimum baud length.

Surprisingly, it has been invented that not keeping the baud length of a digital code constant allows to construct codes that—if needed—can have an advantageously short length in terms of bauds, and yet display error minimizing properties that are far better than those of e.g. Barker codes, which have been widely considered to represent the ultimate limit of code efficiency. The advances in error minimizing properties are achieved best when the smallest unit in sampling resolution is shorter than the shortest baud length. In order to exploit the practical consequences of this innovation, a transmitting device must be capable of generating an encoded transmission where not all bauds in the code have the same length in time. A receiving device must apply a high enough initial sampling rate so that the encoded transmission with variable baud length can be received and the non-uniform length bauds can be reliably separated from each other. With non-constant baud length codes can be always constructed with no zeroes in their Fourier transforms.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION AND EMBODIMENTS

In radar systems, there is typically a limit to the smallest baud length, which limit arises from available bandwidth due to transmission system or license constraints. However, in many cases the accuracy at which transitions between transmission symbols can be timed is much higher, i.e. controllable at much better resolution in time than the baud length.

Figure 1:
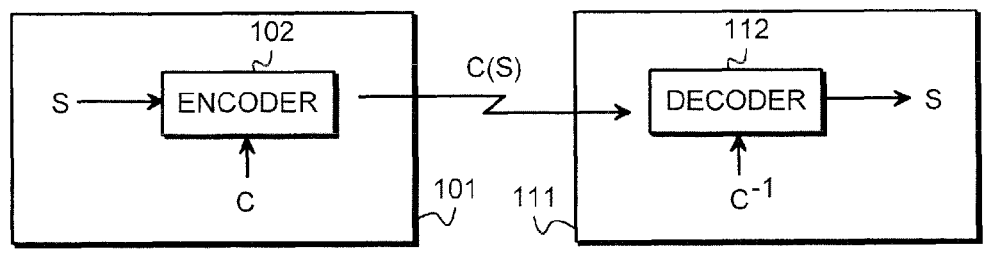
FIG. 1 illustrates a known application of coding in communications.
Figure 2:
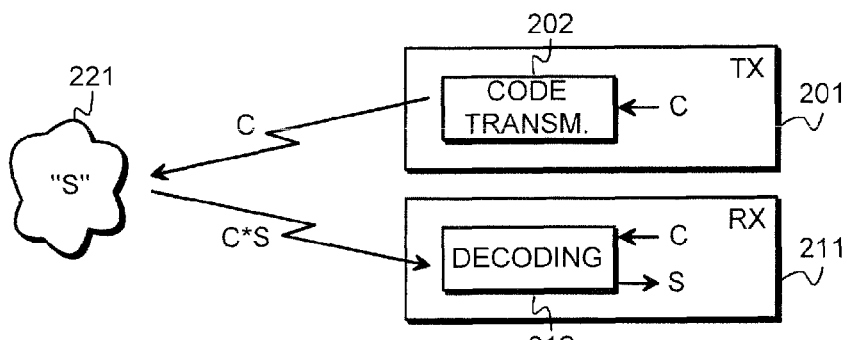
FIG. 2 illustrates a known application of coding in remote sensing.
Figure 3:
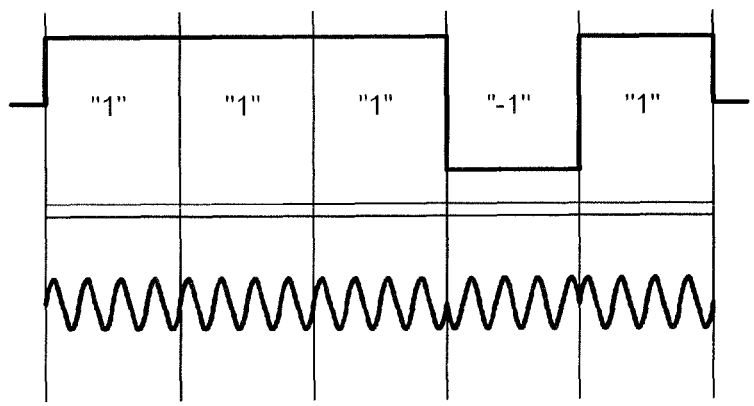
FIG. 3 illustrates a Barker code of length 5.

As an illustrative example we will first compare a phase-modulated transmission encoded with a known Barker code of length 5 to a corresponding transmission encoded with an exemplary code of 5 values without a constant baud length. In FIG. 3, the upper curve is a baseband representation of the known Barker code of length 5. In other words the curve represents the sequence of code values "1, 1, 1, −1, 1".

Baud length is constant, which means that each of the five consecutive code values remains valid for the duration of a fixed interval of time. This is most easily seen by comparing the five white rectangles in the middle row of FIG. 3, which are all equally long and extend from one baud border to the other. The lower curve in FIG. 3 illustrates how a phase-modulated transmission encoded with the Barker code would look like. For reasons of graphical clarity, the "transmission" appears here at a frequency that is only four times the baud frequency; in other words, exactly four wavelengths of the transmission signal correspond to one constant baud interval. In an actual transmission the frequency would be very much higher. Since the three first transmission symbols all have the value "1", the phase of the transmission signal stays constant throughout the first tree baud intervals. The value "−1" in the fourth baud interval causes a phase shift of $\pi$ radians in the transmission signal, after which the initial phase is resumed due to the value "1" in the fifth baud interval.

Figure 4:
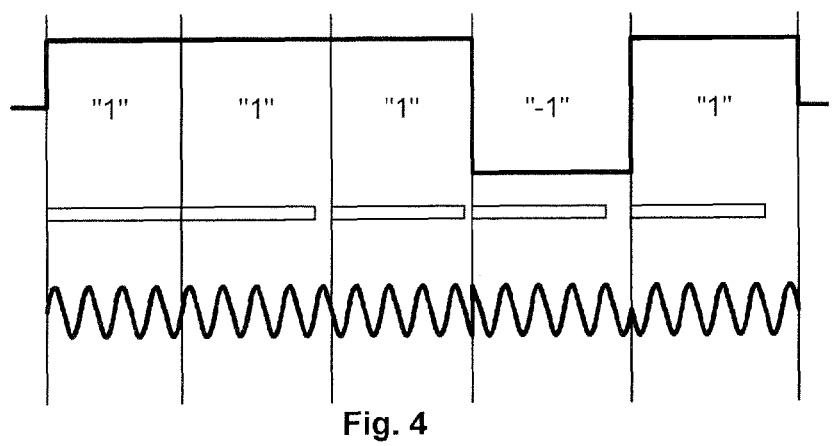
FIG. 4 illustrates a code of 5 code values without a constant baud length.

In FIG. 4, the sequence of code values "1, 1, 1, −1, 1" is the same and thus constitutes a certain finite sequence of code values, but now there is no such thing as constant baud length. There is a certain minimum baud length, which we may assume to come from system-specific, regulatory, or other limitations, and which we consequently may call a predetermined minimum baud length. In FIG. 4 this predetermined minimum baud length corresponds to the length of one white rectangle in the middle row in the drawing.

Since the expression "baud length" has an established meaning on this technical field that implicitly includes an assumption of constant length in time, it may be better to introduce a different expression to describe the code value-specific period of time that is associated with each code value in FIG. 4. In this description we will use the expression "validity period" for this purpose. We assume that transmitting (or more generally: outputting) a coded electromagnetic signal will take place during a certain period of time, and—if a single sequential code is used—that period of time is divided into consecutive subperiods, so that one code value will remain valid during each subperiod. The length in time of a subperiod during which one code value remains valid is the validity period specific to that code value. Together, the code value and its validity period constitute a baud.

Each of the validity periods is longer than or equal to the predetermined minimum baud length, and there are code values of different validity periods in the finite sequence of code values. How the lengths of the validity periods are selected will be discussed in detail later in this description. For the time being we may note that the validity periods are selected to have particular lengths that, taken in association with the code values themselves, optimize the code in the sense of advantageous autocorrelation properties. In particular, the validity periods of the code values optimize a covariance matrix specific to that particular finite sequence of code values.

Figure 5:
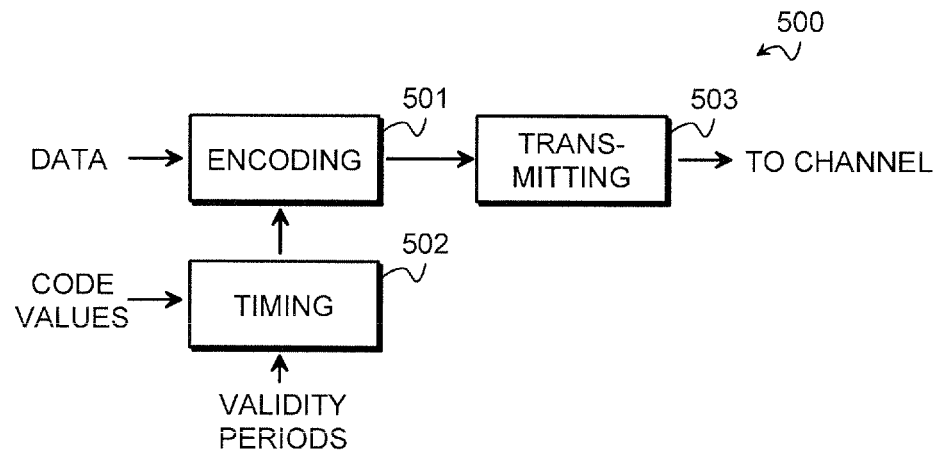
FIG. 5 illustrates the use of a code according to an embodiment of the invention in communications.
Figure 6:
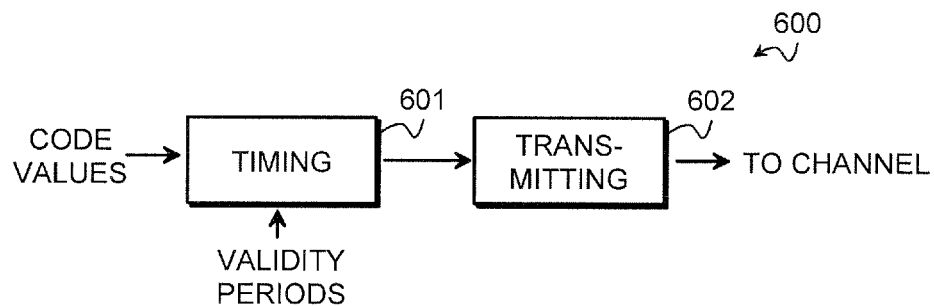
FIG. 6 illustrates the use of a code according to an embodiment of the invention in remote sensing.

In order to illustrate the applicability of the invention in a transmitting device, we will shortly consider the schematic examples illustrated in FIGS. 5 and 6. Of these, FIG. 5 illustrates schematically a communications device 500 configured to transmit data in coded form. As was pointed out in the description of prior art, the data to be transmitted can be any data and its contents need not (and typically cannot) be known beforehand. The data may be e.g. digitized speech or other sound, digitized image or video data, or any kind of digital data transmitted between computer devices. The data is encoded in an encoder 501. The code which the encoder 501 uses is a finite sequence of code values, where each code value has a validity period specific to that code value. The code can be repeated over and over again in the encoder 501 if transmitting the data takes longer than one whole length of the code.

Schematically considered, the bauds of the code come to the encoder 501 from a timing block 502, which has knowledge of both the code values and their associated, code value-specific validity periods. Thus in this case the timing block 502 is an electronic device configured to output a finite sequence of code values according to an embodiment of the invention. In practical transmitting devices it is not necessary to have the encoder 501 and the timing block 502 implemented as physically separate blocks, but they can be functionalities of a common physical entity, such as a processor. In that case, even if the bauds are only used inside the processor, the processor is an electronic device configured to output a finite sequence of code values according to an embodiment of the invention, because the code values are output from one functionality of the processor to the use of another functionality of the processor.

The output of the encoder 501 is encoded data, which is taken to a transmitter 503 for transmission into the communications channel that is used to convey the encoded data towards its intended recipient. Appropriate modulation and upconversion steps, if needed, are implemented in the transmitter 503. In some cases a constant value may be given to the encoder 501 as data, and especially said constant value may remain as "data to be transmitted" for a duration of time that is longer than one whole length of the code. In that case what comes out of the transmitter 503 is a finite sequence of (modulated, and upconverted) code values exactly representing those that the timing block 502 output to the encoder 501 immediately before. Thus, taken that the nature and the contents of the data to be transmitted are not predetermined, also the whole communications device 500 is an electronic device configured to output a finite sequence of code values according to an embodiment of the invention.

FIG. 6 illustrates schematically a remote sensing device 600 configured to make coded transmissions. It is characteristic to remote sensing devices of this kind that there is no data to be transmitted, only the code. Therefore it is sufficient to have in the remote sensing device 600 a timing block 601, which combines code values and their associated, code value-specific validity periods and outputs a finite sequence of code values so that each of them has a validity period specific to that code value. These are taken to a transmitter 602, which implements the appropriate modulation and upconversion steps as necessary, and transmits the resulting signal into the channel that is used to convey it towards the target. In this case it is even more evident than in FIG. 5 that both the timing block 601 and the whole remote sensing device fulfil the description of an electronic device configured to output a finite sequence of code values according to an embodiment of the invention.

Figure 7:
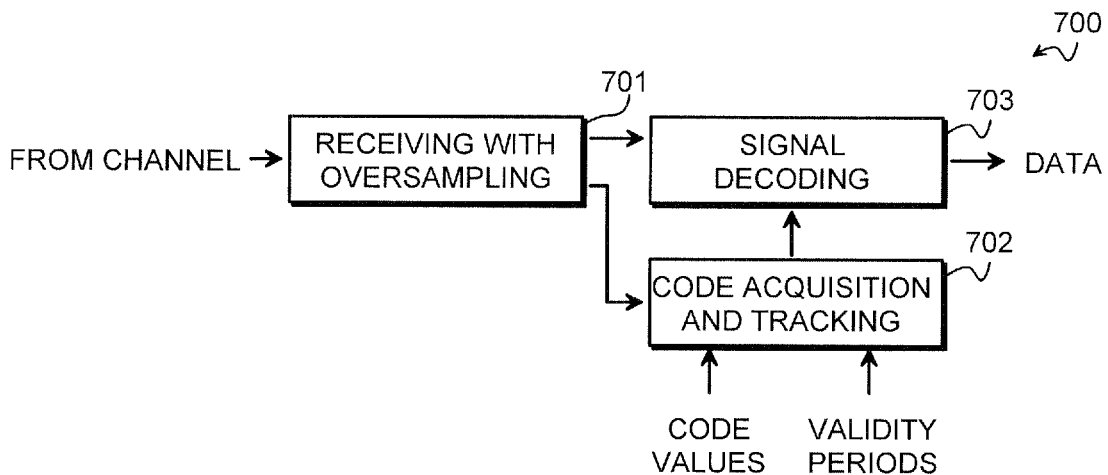
FIG. 7 illustrates the use of a code according to an embodiment of the invention at a receiving end.

FIG. 7 illustrates schematically a receiving device 700 configured to receive a transmission encoded with a finite sequence of code values according to an embodiment of the invention. A receiver 701 receives the signal from the channel through which it came, and converts it into digital form by using a large enough oversampling ratio. After downconversion to a baseband frequency where decoding takes place, enough oversampling should remain in order to differentiate between the different lengths of validity periods associated with different code values. For example, if the minimum difference of length between two validity periods is 1/10 of the predetermined minimum baud length (i.e. so that allowed validity periods have lengths of 10, 11, 12, ... units), the theoretical minimum for the remaining oversampling frequency is ten times the inverse of the predetermined minimum baud length.

The output of the receiver 701 is taken to a code acquisition and tracking block 702, the task of which is apparent from its name. It processes the received signal enough to find the appropriate timing and phase of the code with which the transmission was originally encoded, and once found, maintains synchronism with the code. Based on this information a signal decoder 703 decodes the data that came embedded in the received signal. The operation of both a communications receiver and a remote sensing receiver can be modelled similarly, although the continuous, essentially real time decoding requirement of a communications receiver differs from the possibility of storing and post-processing data that is available to a remote sensing receiver. For the last-mentioned reason remote sensing receivers are typically modelled in a different way. One such way will be explained in detail later in this description.

We will now discuss a mathematical background for the optimization of codes where the validity periods of individual code values may vary. As a frame of reference we will consider the amplitude domain inversion of range- and possibly Doppler-spread targets, when a better resolution than the minimum allowed baud length of the radar transmission envelope is required.

In radar systems, there is a limit to the smallest baud length, which limit arises from the available bandwidth, due to transmission system or licensing constraints. However, in many cases the transmission envelope can be timed with much higher precision than the minimum baud length. For example, the EISCAT (European Incoherent Scatter Scientific Association) UHF (Ultra High Frequency) and VHF (Very High Frequency) mainland systems in Tromsø are, at the time of writing this description, capable of timing the transmission envelope at 0.1 microseconds resolution, while the minimum allowed baud length is 1 microsecond. Thus it is possible to use transmission codes with non-uniform validity periods for the code values that are timed with 0.1 microseconds accuracy, as long as even the shortest validity period is longer than or equal to 1 microsecond. This principle can then be used to achieve range resolution that is better than what would be obtained using a uniform baud-length radar transmission code where each code value would be valid for a period that is an integer multiple of 1 microsecond. The reason for the inferior resolution in the latter case is that the uniform baud length will cause a singular or near-singular covariance matrix when analyzing coherent target echoes with sub-baud range-resolution.

In the following we first derive the target parameter estimation covariance for range- and Doppler-spread radar targets when estimating target parameters in amplitude domain. Then we define transmission code optimality for a given target. After this we present two search strategies which can be used to find optimal transmission codes: an exhaustive search algorithm and an optimization algorithm. As an example, we briefly study optimality in the case of a range spread coherent target, and a range and Doppler spread target.

We will treat the problem in discrete time. The measurement sample rate is assumed to be the same as the required target range resolution.

A transmission envelope can be described as a baseband sequence of L samples. If the transmission envelope has much less bauds Nb<<L than samples, it is economical to represent the transmission code in terms of bauds, i.e. code values that have code value-specific validity periods. In this case, the envelope can be described in terms of the lengths (or validity periods) $l_j$, phases $\phi_j$, and amplitudes $a_j$ of the bauds. We can define an arbitrary transmission envelope as $$\epsilon_t = \sum_{j=1}^{N_b} [t \in B_j] a_j e^{i\varphi_j}, \quad (1)$$

where the square bracket is the so-called Iverson bracket, which evaluates to 1 if the logical expression inside the bracket is true, and zero otherwise. In this case the Iverson bracket evaluates to 1 if the index t is within the set of indices $B_j = \{\Sigma_{i=0}^{j-1} l_i + 1, \ldots, \Sigma_{i=1}^{j} l_i\}$ within baud j, and zero otherwise. Additionally we define $l_0 = 0$. In this discussion the code power is always normalized to unity; $\Sigma_{t=-\infty}^{\infty} |\epsilon_t|^2 = 1$, which means that the variances are comparable between transmission envelopes that deliver a similar amount of radar power. The codes can also be normalized otherwise, if comparison between two envelopes of different total power is needed.

Target Estimation Variance

We will use B-splines to model target backscatter. Using discrete time and range, and assuming that our receiver's impulse response is sufficiently close to a boxcar function, the direct theory for a signal measured from a radar receiver can be expressed as a sum of range lagged transmission envelopes each multiplied by the target backscatter amplitude:

$$m_t = \Sigma_{r=R} \epsilon_{t-r} \zeta_{r,t} + \xi_t. \quad (2)$$

Here $m_t \in \mathbb{C}$ is the measured baseband raw voltage signal, $R = \{R_{min}, \ldots, R_{max}\} \subset \mathbb{N}$ is the target range extent, $\epsilon_t \in \mathbb{C}$ is the transmission modulation envelope, $\zeta_{r,t} \in \mathbb{C}$ is the range and time dependent target scattering coefficient, and $\xi_t \in \mathbb{C}$ is measurement noise consisting of thermal noise and sky-noise from cosmic radio sources. The time dependency in the target scattering coefficient may have different interpretations depending on measurement geometry. For example a scientific radar used for ionospheric research points essentially to one direction throughout the measurement, which means that the time dependency reflects changes over time in phenomena that take place in the spatial region illuminated by the stationary antenna beam. In navigation and reconnaissance radars the antenna beam moves constantly, in which case—if the antenna movement is fast enough to be significant—the time dependence may be interpreted as changes in the region illuminated by the antenna beam, even if the scattering targets themselves would remain constant over time. With slowly moving antennas each measurement may be considered as made in one direction only, and the movement of the antenna beam must be taken into account by combining results from different measurements.

The measurement noise is assumed to be a zero mean distribution of complex Gaussian white noise with variance $E\xi_{r}\overline{\xi_{t1}}=\delta_{t,t1}\tau^2$. Ranges r are defined in round-trip time at one sample intervals, t also denotes time in samples. By convention, we apply a range dependent constant $$\frac{r}{2}$$

delay, so that the range dependent backscatter amplitude is $\zeta_{r,t}$ instead of $$\zeta_{r,t} - \frac{r}{2}.$$

Figure 8:
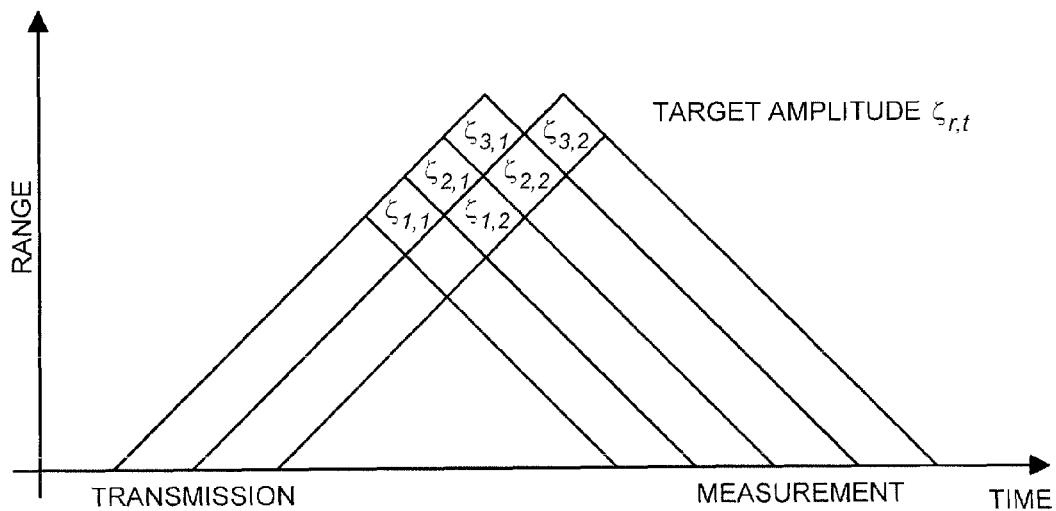
FIG. 8 illustrates the concept of range gates.

FIG. 8 depicts backscatter from three range gates probed with two transmission samples. To simplify matters, we use overlapping triangular range gates and assume the transmission to be of constant phase during one sample.

Now if the target backscatter is constant in time, $\zeta_{r,t}=\zeta_r$, the measurement equation becomes a convolution equation. In the case of an infinitely extended target, the measurement is $$m_t = \pi_{r=-\infty}^{\infty} \epsilon_{t-r} \zeta_r + \xi_t, \quad (3)$$

which is the most common measurement equation for radar targets. It can be solved using filtering, which has been shown e.g. in the prior art publications Sulzer M. P.: Recent incoherent scatter techniques, Adv. Space Res., Vol. 9, pp. 153-162, 1989; and Ruprecht J.: Maximum-Likelihood Estimation of Multipath Channels, PhD thesis, Swiss federal institute of technology, 1989; which are incorporated herein by reference. For a finite range extent, the filtering approach is not optimal, as it has a larger error variance, and does not properly take into account possible edge effects. For a finite range extent, the optimal approach is to use a linear theory matrix that explicitly defines the finite range extent. We will define this as a special case of the incoherent backscatter theory presented next.

If the target backscatter is not constant, the range dependent backscatter $\zeta_{r,t}$ has to be modelled in some way in order to make the estimation problem solvable. One advantageous choice is to assume that the target backscatter is a band-limited signal, which can be modelled using a B-spline. Background information for this approach can be found in the prior art publication de Boor C.: A Practical Guide to Splines, pp. 114-115, Springer-Verlag, 1978, incorporated herein by reference. Our model parameters will consist of $N_s$ control points that model the backscatter at each range of interest. The frequency domain characteristics are defined by the spacing of the knots in the spline and the order n of the spline. Using the definition of B-splines, the target backscatter $\zeta_{r,t}$ is modelled using the parameters $P_{r,k} \in \mathbb{C}$ as:

$$\hat{\zeta}_{r,t} = \sum_{k=0}^{N_s-1} P_{r,k} b_{k,n}\left(\frac{t-1}{L-1}\right), \quad (4)$$

where $b_{k,n}(\cdot)$ is the B-spline basis function, and coefficients $P_{r,k}$ are the control points with $k \in \{1, \ldots, N_s\}$. We assume that the control points are evenly spaced and that the endpoints contain multiple knots in order to ensure that the second order derivatives are zero at both ends of $\hat{\zeta}_{r,t}$. We also define a special case of one spline control point as $\hat{\zeta}_{r,t}=P_r=\zeta_r$. This corresponds to a completely coherent target.

When equation (4) is substituted into equation (2), we get $$m_t = \sum_{r \in R} \sum_{k=0}^{N_s-1} P_{r,k} \epsilon_{t-r} b_{k,n}\left(\frac{t-1}{L-1}\right) + \xi_t. \quad (5)$$

This model is linear in respect to the parameters $P_{r,k}$ and one can conveniently represent it in matrix form as $$m = Ax + \xi, \quad (6)$$

where $m=[m_1, \ldots, m_N]^T$ is the measurement vector, A is the theory matrix containing the $\epsilon_{t-r} b_{k,n}(\cdot)$ terms, $x=[P_{1,1}, P_{1,2}, \ldots, P_{N_r,N_s}]^T$ is the parameter vector containing the control points, and $\xi=[\xi_1, \ldots, \xi_N]^T$ is the error vector with the second moment defined as $$E\xi\xi^H = \Sigma = \text{diag}(\sigma^2, \ldots, \sigma^2). \quad (7)$$

The number of parameters is the number of ranges $N_r$ times the number of B-spline control points $N_s$ per range. The number of measurements $N=N_r+L-1$ is a sum of target ranges and transmission envelope length L. A long as $N \geq N_r N_s$, the theory matrix has sufficient rank and the problem can be solved using statistical linear inversion. In practice, the number of model parameters that can be successfully modelled with sufficiently small error bars depends on the signal to noise ratio. The estimation of strong range and Doppler spread echoes has been shown in the prior art publication Vierinen J., Lehtinen M. S., and Virtanen I. I.: Amplitude domain analysis of strong range and Doppler spread radar echos, Annales Geophysicae, Vol. 26, pp. 2419-2426, 2008, incorporated herein by reference.

Figure 9:
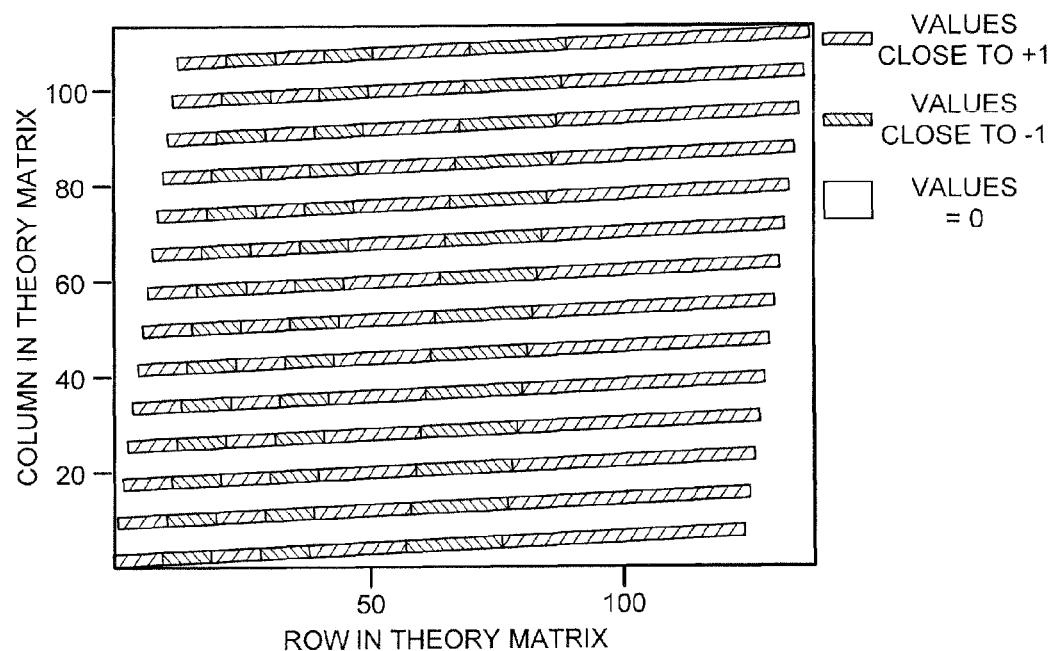
FIG. 9 illustrates the theory matrix of a Barker code of length 13.

FIG. 9 is an approximate graphical representation of an exemplary theory matrix. In this case the target range extent $N_r=14$ (i.e. there are 14 range gates) with $N_s=8$ B-spline guide points per range. The transmission code in this case is a constant-baud-length Barker code of length 13, and there are 10 samples per baud, i.e. $l_j=10$. White areas in the graphical representation mark zero values in the matrix. Non-zero values in the theory matrix are situated in as many slightly oblique lines as there are range gates, and in each line their values toggle between equal or close to +1 an equal or close to −1 according to the code values in the Barker code of length 13 (which are: +1, +1, +1, +1, +1, −1, −1, +1, +1, −1, +1, −1, +1).

The probability density for equation (6) can be written as:

$$p(m \mid x) \propto \exp\left(-\frac{1}{2\sigma^2} \|m - Ax\|^2\right), \quad (8)$$

and assuming constant valued priors, the maximum a posterior (MAP) estimate, i.e. the peak of $p$ (m|x) is:

$$x_{MAP} = (A^H A)^{-1} A^H m, \quad (9)$$

and the a posteriori covariance is:
$$\Sigma_p = \sigma^2 (A^H A)^{-1}. \tag{10}$$

In the special case of an infinitely extended coherent target ($N_s=1$), the matrix A becomes a convolution operator and the problem can be efficiently solved in frequency domain and numerically evaluated using FFT (Fast Fourier Transform) as introduced in the prior art publication Cooley J. W., Tukey J. W.: An algorithm for the machine calculation of complex fourier series, Math. Comput. Vol. 19, pp. 297-301, 1965. This case has been extensively discussed in various prior art publications, such as Lehtinen M. S., Virtanen I. I., Virtanen J.: Fast comparison of IS radar sequences for lag profile inversion, Annales Geophysicae, Vol. 26, pp. 2291-2301, 2008; Vierinen J., Lehtinen M. S., Orispää M., Damtie B.: General radar transmission codes that minimize the measurement error of a static target, arxiv:physics/0612040, published online at arxiv.org, 2006; Lehtinen M. S., Damtie B., Nygrén T.: Optimal binary phase codes and sidelobe-free decoding filters with application to incoherent scatter radar, Annales Geophysicae 2004; and Ruprecht J.: Maximum-Likelihood Estimation of Multipath Channels, PhD thesis, Swiss federal institute of technology, 1989. Said reference publications are incorporated herein by reference. The covariance matrix will be an infinitely extended Toeplitz matrix with rows:

$$\Sigma_t = \lim_{M \to \infty} \frac{1}{M} \mathcal{F}_M^{-1} \left\{ \left( \mathcal{F}_M \left\{ \sum_{r=-\infty}^{\infty} \epsilon_t \overline{\epsilon_{t+r}} \right\} \right)^{-1} \right\}.$$

Here the index t refers to the column of the matrix row. Operators and $\mathcal{F}_M$ and $\mathcal{F}_M^{-1}$ are the forward and reverse discrete Fourier transforms of length M. In practice the covariance can be approximated numerically with sufficiently large values of M.

This result is also a fairly good approximation for a sufficiently long finite range extent, differing only near the edges. However, this result is not valid for a sufficiently narrow finite range extent or when the target also has Doppler spread. Also, it is not even possible to calculate the covariance matrix in this way for uniform-baud-length codes when the baud length is larger than the target resolution. The reason for this is that for an infinitely extended target there will be zeroes in the frequency domain representation of the transmission envelope, and because of this the covariance matrix is singular. Even in the case of a finite range extent, all codes with uniform baud length have strong linearly dependent components. Using a code according to an embodiment of the invention, with code value specific validity periods instead of any uniform baud length, the problem can be avoided, because it is possible to form a code without zeroes in the frequency domain.

Code Optimality

The performance of a code is determined by the target parameter estimation errors. These on the other hand are determined by the a posteriori covariance matrix $\Sigma_p$ in equation (10) above. The theory matrix A contains the transmission envelope (see e.g. the reflection of the +1 and −1 values of the Barker code of length 13 in the graphical representation of FIG. 9) and therefore affects the covariance matrix. The task of code optimization is to find a code, the covariance matrix of which produces the best possible estimates of the target. However, it is not possible to reduce a covariance matrix into a scalar value (which would enable straightforward arranging of different covariance matrices into an order reflecting their optimality) without losing information. A code $\epsilon_1$ is in every situation better than some other code $\epsilon_2$ only if the difference of their corresponding covariance matrices $\Sigma_2 - \Sigma_1$ is positive definite. In other cases the code optimality is not unique, as discussed in the prior art publication Piiroinen P: Statistical measurements, experiments and applications, Academia Scientiarum Fennica, 2005, incorporated herein by reference.

However, in order to simplify code searches, it is possible to derive a mapping function from the covariance matrix to a real number, $\Omega: \mathbb{R}^{N_p \times N_p} \to \mathbb{R}$, while still retaining some of the information contained in the covariance matrix. One such mapping function is the trace of the covariance matrix, $\Omega(\Sigma) = \text{tr}(\Sigma)$, which is called A-optimality in terms of optimal statistical experiment design. This has the effect of minimizing the average variance of the model parameters. We will use this criterion throughout this description. More discussion on optimization criteria can be found e.g. in the prior art publication Pukelsheim F.: Optimal Design of Experiments, John Wiley & Sons, 1993, incorporated herein by reference.

For infinitely extended static targets, the trace of the covariance matrix is infinite, but one can use the diagonal value of one row of the covariance matrix. Because it is of Toeplitz form, all diagonal values are the same, and this will correspond to A-optimality.

Code Search

The transmission envelope consisting of $N_b$ bauds is fully described by the validity periods $l_k \in \Gamma \subset \mathbb{N}$, phases $\phi_k \in P \subset [0,2\pi]$, and amplitudes $a_k \in \Lambda \subset \mathbb{R}^+$. Here $\Gamma$ is the set of allowable validity periods. It consists of a grid of time values between the predetermined minimum baud length and some reasonable maximum, with grid spacing determined by how accurately the transmitting equipment can time the transmission envelope. P is the set of allowable phase values, which consists of a grid of values with a spacing determined by how accurately the transmitting equipment can differentiate between phases. $\Lambda$ is the set of allowable amplitude values, which consists of a grid of values with a spacing determined by how accurately the transmitting equipment can differentiate between amplitudes. The set of parameters to optimize is $$(l_k, \phi_k, a_k) \subset \Gamma^{N_b} \times P^{N_b} \times \Lambda^{N_b}. \tag{11}$$

For reasonably short codes with sufficiently small number of grid points in the set of allowable phase values P and the set of allowable amplitude values $\Lambda$, it is possible to perform an exhaustive search. The number of different ways to divide an L sample long transmission envelope into bauds of different validity periods amounts to a problem of integer partitioning that has been extensively studied in prior art. When additional constraints to validity periods are applied, the problem becomes a multiply restricted integer partitioning problem. An efficient algorithm for iterating through restricted partitions has been described in the prior art publication Riha W., James K. R.: Algorithm 29 efficient algorithms for doubly and multiply restricted partitions, Computing, Vol. 16, pp. 163-168, doi: 10.1007/BF02241987, 1976, which is incorporated herein by reference. Additionally the exhaustive code search required iterating through all permutations of phases and baud positions.

As all numerical optimization problems, the exhaustive search becomes increasingly resource-consuming if the sets of allowable values are large. Due to the multiplicity of the parameters and permutations, it is also fairly complicated to implement in practice. As an alternative to a brute force exhaustive search, it is possible to apply some more systematic numerical optimization principle, such as e.g. simulated annealing or differential evolution, in order to find optimal codes.

The aim of using a code optimization procedure is to find well-performing codes with non-uniform validity periods for its bauds, given a set of constraints. The constraints are given as the set of allowed validity periods Γ, the set of allowable phase values P, and the set of allowable amplitude values Λ. A somewhat resembling algorithm for optimizing codes for coherent and incoherent scatter radars has been described in the prior art publications Vierinen J., Lehtinen M. S., Orispää M., Damtie B.: General radar transmission codes that minimize the measurement error of a static target, arxiv:physics/ 0612040, published online at arxiv.org, 2006; and Vierinen J., Lehtinen M. S., Orispää M, Virtanen I. I.: Transmission code optimization method for incoherent scatter radar, Annales Geophysicae, 2008; which are incorporated herein by reference. Important differences to said prior art methods arise for example from the more specific constraints introduced here, including the possibility of varying the validity period of one or more bauds.

According to an embodiment of the invention, the search for an optimized code begins with randomizing a code $E \equiv (l_k, \phi_k, a_k)$ that meets the given constraints. This initial phase is illustrated as step 1001 in FIG. 10. Next, for a certain number of iterations we incrementally attempt to improve this code with small random changes, resulting in a changed code $E' = \delta E$. Here $\delta$ is an operator that modifies the code E in some way. If any of these changes results in a code that is better, we then save these parameters (E=E') and continue to the next iteration. In order to prevent the algorithm from getting struck in any local minima we also sometimes allow changes that do not improve the code.

Figure 10:
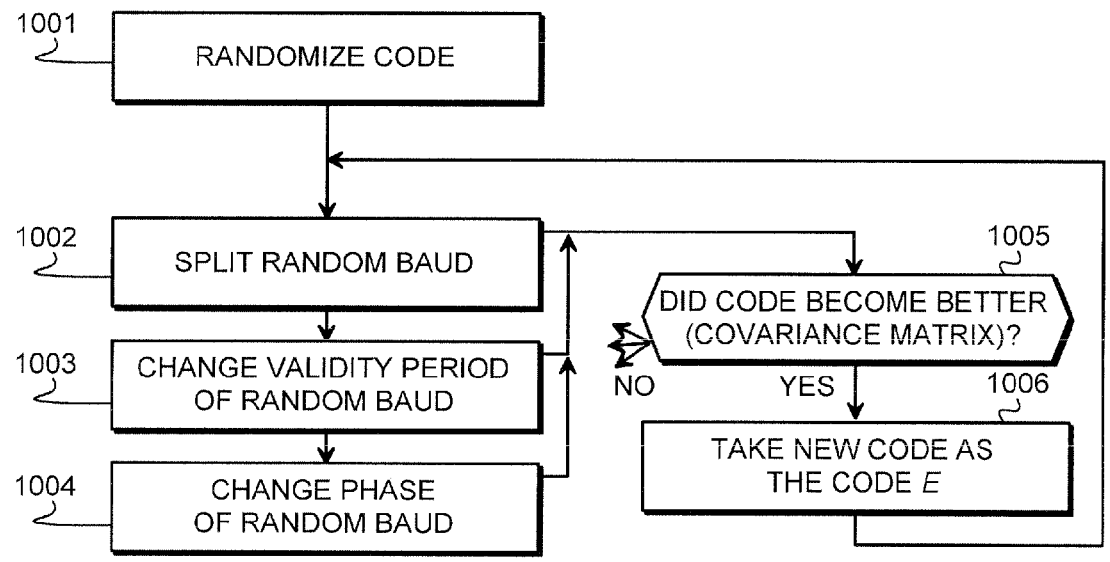
FIG. 10 illustrates an exemplary way of generating a code according to an embodiment of the invention.

In the schematic representation of FIG. 10 the small incremental changes are illustrated as splitting a random baud in two or more new bauds in step 1002, changing the validity period of a random baud at step 1003, and changing the phase of a random baud at step 1004. If changes in the amplitudes of bauds are allowed, there could be a fourth incremental change step representing changing the amplitude of a random baud. All incremental changes are designed so that they always conform with the criteria imposed on the transmission code. For example, step 1002 where a random baud is split includes a limitation, according to which it can only be performed if the resulting new bauds are not shorter than the predetermined minimum baud length. The limitations can be generally characterised by saying that after the incremental change, the values of all validity periods, phases, and amplitudes must come from the appropriate sets of allowed validity period, phase, and amplitude values respectively.

In the schematic representation of FIG. 10, each incremental change is followed by an evaluation at step 1005, where a mapping function is applied to the covariance matrices corresponding to the old and new codes E and E' to determine, which of them has better performance. If the incremental change did not improve the code, a return occurs from step 1005 to the incremental change step from which the reference to step 1005 was made. If the incremental change improved the code, the changed code becomes the code E at step 1006. The self-evident step of ending the code searching process after some maximum number of iterations (or at the fulfillment of some other predetermined ending condition), as well as the intentional allowing of a non-improving change in the code every now and then, are not illustrated in FIG. 10 for reasons of graphical clarity.

In order to initially randomize a code at step 1001, several possibilities exist. As an example, one may begin with a trivial code that has only one long baud, and perform a number of the same incremental changes as those used in the optimization (i.e. code searching) process, except that during the initial randomization all changes that cause the code to remain within the allowable sets of validity period, phase, and amplitude values are accepted, irrespective of whether they caused any improvement. Another possibility is to use some known code, like a Barker code, as a "randomized" starting point, and/or to make some accept-all-type randomization operations starting from such a known code.

Comparison to a Known Code

Figure 11:
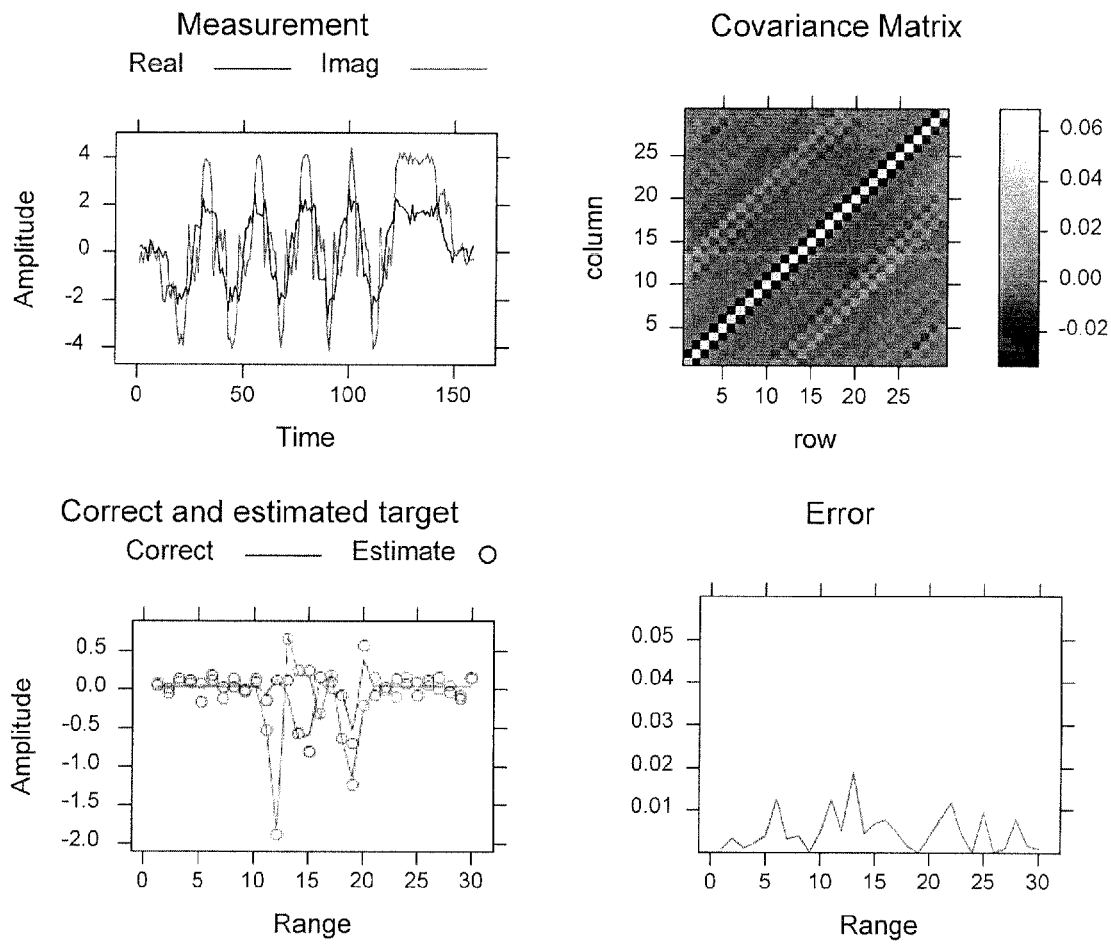
FIG. 11 illustrates the simulated detection of a target with a code according to an embodiment of the invention.
Figure 12:
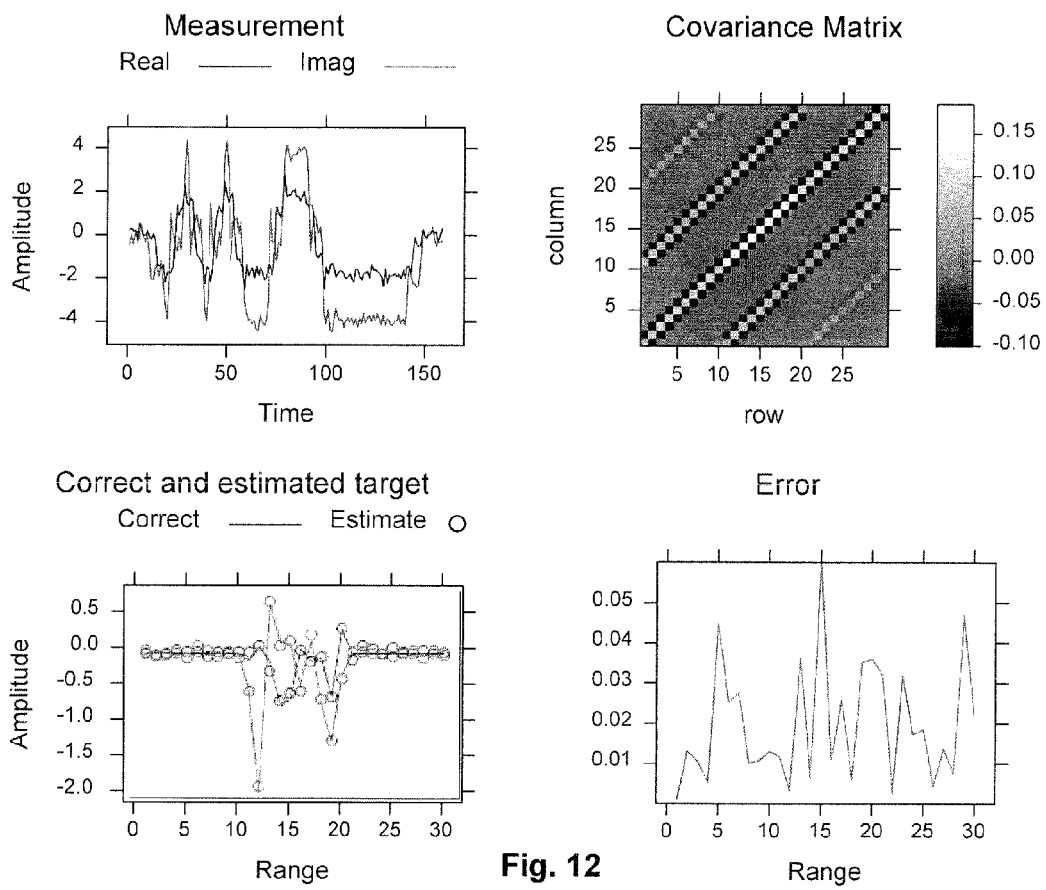
FIG. 12 illustrates the simulated detection of a target with a Barker code of length 13.

FIGS. 11 and 12 demonstrate the performance of a code with non-uniform validity periods of its bauds when estimating a target at sub-baud resolution, where nonuniform baud lengths are especially advantageous. The basis of these illustrations is the simulation of an echo using a code according to an embodiment of the invention (FIG. 11) and a Barker code of length 13 (FIG. 12). In this example we analyze a 10 sample wide target at the resolution of one sample. The code according to an embodiment of the invention was an optimized binary phase code with 11 bauds. The validity periods of the bauds were {12, 12, 12, 12, 10, 13, 10, 11, 11, 15, 12} units of time (here also: samples, or sampling intervals) and their phases were {1, −1, 1, −1, 1, −1, 1, −1, 1, −1, −1}. The predetermined minimum baud length was 10 samples. In the Barker code of length 13 the uniform baud length was 10 samples. Both simulations had the same instance of simulated measurement noise with signal to noise ratio SNR=3, and the same simulated target, which in this case was a complex random NC(0,1) process.

A comparison of FIGS. 11 and 12 shows that the code according to an embodiment of the invention performs better. It is evident that the Barker code suffers from the fact that every baud is the same length—if the range extent would have been infinite, the covariance matrix would have been singular. Now the covariance matrix is only near-singular.

Advantageous results have been obtained with codes according to an embodiment of the invention in cases where there is good signal to noise ratio and sufficient received bandwidth, but a limited transmission bandwidth. Examples of practical uses in scientific radar measurements are Lunar measurements, meteor trail studies, and artificial ionospheric heating induced enhanced ion- and plasma-line echoes. In the preceding description the codes with code value-specific validity periods have been mostly considered in the case of amplitude domain target estimation, but the same principles can also be applied to find optimal high resolution transmission codes for lag-profile inversion, known features of which are described in the prior art publication Virtanen I. I., Lehtinen M. S., Nygren T., Orispää M., Vierinen J.: Lag profile inversion method for EISCAT data analysis, Annales Geophysicae, 2008, which is incorporated herein by reference.

Examples of Some Device Implementations

Figure 13:
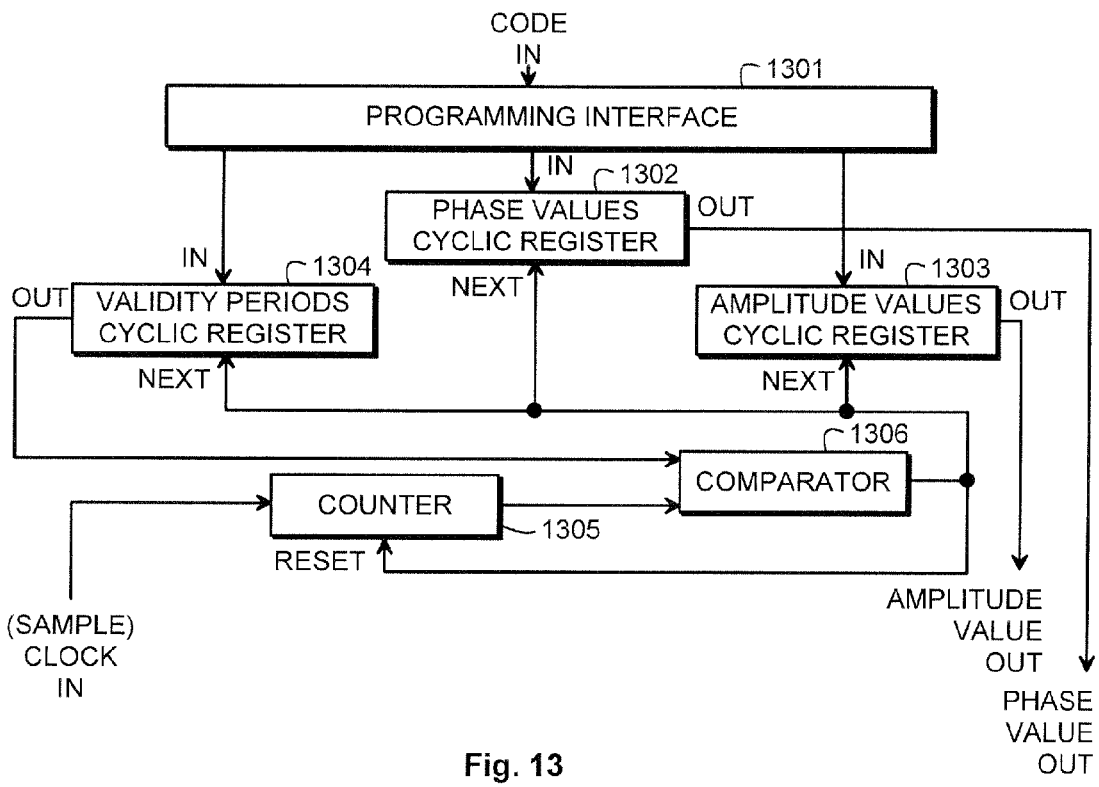
FIG. 13 illustrates an example of an apparatus, a method, or a program product for outputting code values according to an embodiment of the invention.

The invention does not limit the way in which it is ensured that each code value will be held valid exactly for the duration of its associated validity period. This can be done for example completely as a software routine executed by a processor, or alternatively even completely with hard-wired logic. FIG. 13 is a schematic illustration of an example of the latter, but it could quite as well be read as an operating specification of a software routine. The code, i.e. its code values and their associated validity periods, is programmed to the device through a programming interface 1301. In this example we assume that the code comprises both phase and amplitude values for the bauds. There is a cyclic register for phase values 1302, another cyclic register 1303 for the respective amplitude values, and yet another cyclic register 1304 for validity periods. A cyclic register means a storage location into which a number of individual values can be stored, and from which the stored values can be read one by one in a sequence so that after the last value in the sequence the first one is read again, and the cyclic reading of the stored values can continue endlessly. The phase and amplitude values may be stored in any format in which they are useful to an encoding step later (not shown). The validity periods are stored as digital values that represent the length of each validity period in counts of a suitable clock signal, with a frequency such as the sample clock frequency used in the corresponding receiver.

During the operation of the device (or software routine) illustrated in FIG. 13, a clock signal of said frequency is delivered to a counter 1305. It counts the cycles in the clock signal and feeds the current counting result to a comparator 1306, which compares it to the validity period currently read from the cyclic register 1304 for validity periods. Reading from the cyclic registers is synchronized so that while the comparator 1306 is reading the validity period of some k:th baud from register 1304, the appropriate phase and amplitude values of the corresponding k:th baud are available at the outputs of the cyclic registers 1302 and 1303 respectively. When the count in the counter 1305 becomes equal with the current validity period, the output of the comparator 1306 causes the output of each of the registers 1302, 1303, and 1304 to advance by one, so that the values associated with the next baud now appear at the outputs. Simultaneously the output of the comparator 1306 resets the counter 1305. The apparatus or software routine illustrated in FIG. 13 is suitable for use for example as the timing block 502 or 601 illustrated in FIG. 5 or 6 respectively. It may also be used as a part of the code acquisition and tracking block 702 in FIG. 7 to maintain a synchronized version of the code in the receiver for decoding purposes.

Figure 14:
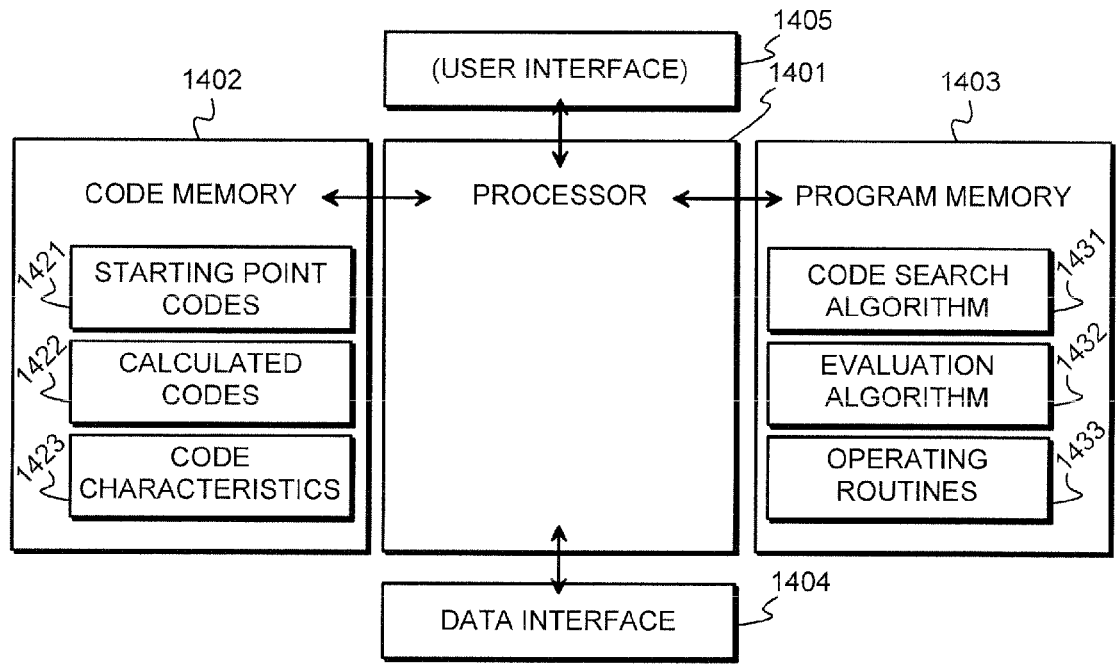
FIG. 14 illustrates an apparatus for generating codes according to an embodiment of the invention.

FIG. 14 illustrates schematically a programmable code source according to an embodiment of the invention. The code source comprises a processor 1401, a code memory 1402, a program memory 1403, a data interface 1404 and optionally a user interface 1405. Said elements do not need to be physically separate entities, but their existence has been separately illustrated in FIG. 14 for reasons of graphical clarity. The processor 1401 is configured to execute programs stored in the program memory 1403. The code memory 1402 is configured to store starting point codes (for example Barker codes or randomized codes) 1421, calculated codes according to embodiments of the invention 1422 and optionally also code characteristics 1423, which describe features of various codes and/or information like the applicability of different codes to different purposes or statistics about code usage. The program memory 1403 is configured to store programs for calculating codes according to embodiments of the invention from starting point codes. Shown in FIG. 14 are a code searching program 1431 that implements e.g. the method of FIG. 10 discussed above, and an evaluation algorithm 1432 that implements the calculation of covariance matrices, the mapping that enables using the covariance matrices as a measure of code optimality, and the bookkeeping of found codes in an order according to their optionality. The program memory 1403 is also configured to store operating routines 1433 that the processor 1401 executes e.g. to respond to inputs from the user and data interfaces, to implement memory management, and the like.

The data interface 1404 is the means for the processor 1401 to communicate with other electronic devices, and the user interface 1405 is the means for the processor 1401 to exchange information with a human user. If the programmable code source has been implemented as a part of a larger computer arrangement, it can use the interfaces of that computer arrangement and does not need any of its own.

Using codes according to embodiments of the invention for communication or remote sensing applications could naturally be accomplished also without the immediate presence of a programmable code source, for example so that a programmable code source has previously calculated a required number of codes and stored them into a memory, from which a communication or remote sensing device can read them and take them into use according to need without e.g. having to know, from which starting point code some particular code has been obtained and through which calculational process. Schematically, one could then consider the "Calculated Codes" part 1422 illustrated in FIG. 14 as such a "read-only" type code source.

Figure 15:
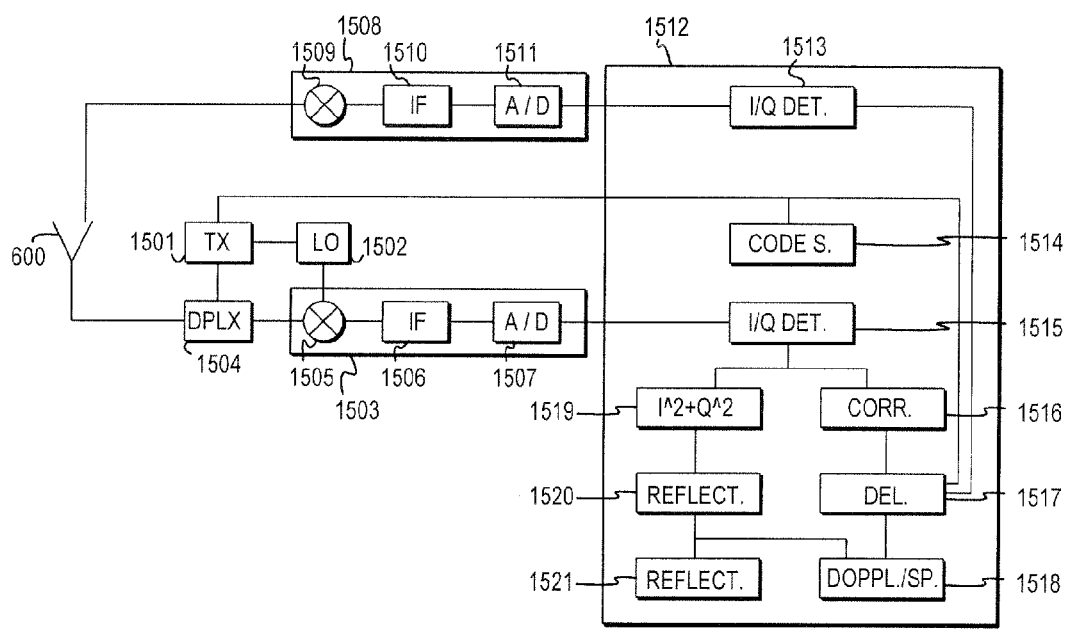
FIG. 15 illustrates a radar system configured to use codes according to an embodiment of the invention.

FIG. 15 shows a radar system, which is an example of a remote sensing system according to an embodiment of the invention. In this example, an antenna 1500 functions as both transmission and reception antenna and the signal is directed from the transmitter 1501 to the antenna or from the antenna to the receiver 1503 by means of a duplexing switch 1504. The receiver 1503 comprises in a known manner an intermediate frequency (IF) mixer 1505, IF amplifier 1506 and an analog-to-digital converter 1507. Mixing frequency comes to the IF mixer 1505 and transmitter 1501 from a local oscillator 1502. In this exemplary radar set a transmitted pulse-coded signal is measured by a separate receiver 1508 which is comprised of corresponding parts: an IF mixer 1509, IF amplifier 1510 and an analog-to-digital converter 1511. Measuring transmitted signals is not necessary in many radar systems where the form and content of the transmitted signal can otherwise be known at the required accuracy.

In the exemplary apparatus the transmitter 1501 is controlled and the received data are processed by a computer 1512. The shape of the pulse-coded signal to be transmitted comes from a code source 1514, which may be for example a programmable code source such as shown above in FIG. 14, or a read-only type code source. Signal detection is performed by means of software in an I/Q detection block 1515. For the detection of measured transmission pulses the system shown in FIG. 15 has a separate detection block 1513. Computation of reflectivity starts with a decoding stage (not separately shown), which may be for example a matrix operation or a filter. After that there is shown the squaring of the signal in block 1519, the result of which is processed so as to become unambiguous with respect to the range by solving in block 1520 the equations representing the response of the measurement. The final radar reflectivity results are produced in block 1521. When the reflectivity values for the various ranges have been calculated, the final results can be produced and stored and/or displayed to the user in a known manner. In the case of a weather radar, a typical end result is a pattern in which the reflectivity values are interpreted as meteorological phenomena (such as rain of different intensities) and presented graphically using color codes. The invention does not limit the way in which the final results are generated or presented.

In some applications it is desirable to obtain the decoded I/Q samples for further processing in the form of complex amplitude, meaning that in the arrangement of FIG. 15 there would be a further connection from block 1515 to some general sorts of further analysis. It should be noted that the signal processing arrangement shown in FIG. 15 is only an example and does not exclude other kinds of signal processing. Since most such signal processing can be made with software routines, an alternative would be to replace what is shown as blocks 1516 to 1521 in FIG. 15 with a general purpose computer.

Computation of delay values is a little more complicated. The cross products of the samples are computed in block 1516 whereafter the equations depending on the range of the delays are solved in block 1517. The coefficients of these equations depend on the contents of the transmitted encoded signal. Therefore, data representing the transmitted signal measured by receiver 1508, and/or data representing the original form of the transmission code from the code source 1514 are included in the solution of the equations in block 1517. The final velocity and Doppler spectrum products are produced in block 1518 which may also use the reflectivity data of block 1520. As regards the generation and storing and/or presentation of the final results, refer to what was stated above in connection with the final results representing reflectivity.

The use of codes according to an embodiment of the invention and the arithmetic blocks described above are preferably realized in the equipment shown in FIG. 15 in such a manner that the computer 1512 comprises at least one program memory in which a stored program controls the operation of the computer 1512 so that the method according to the invention is part of said program. Programming the matrix operations and other arithmetic operations described above into processes executable by a computer is familiar to a person skilled in the art. The computer 1512 may comprise one or more processors to realize the method according to the invention and other tasks relating to the control of the operation of the transmitter 1501 and receivers 1503 and 1508. Preferably the computer 1512 also comprises means, which is known per se, for controlling the movement of the antenna 1500; for simplicity, said means is not shown in FIG. 15. The system of FIG. 15 may be located in a fixed manner at a ground station or on a vehicle, such as airplane, or it may be realized so as to be portable.

Maintaining a minimum baud-length effectively means that the effective transmission bandwidth is similar as it would be with uniform length bauds and most of the information is contained within that bandwidth. This allows the remote sensing application also to gracefully degrade and function fairly well in situations where receiver bandwidth is restricted to the one corresponding to the constant baud length, due to e.g. interference issues at remote receiver sites.

Additional Applications in Communications

Figure 16:
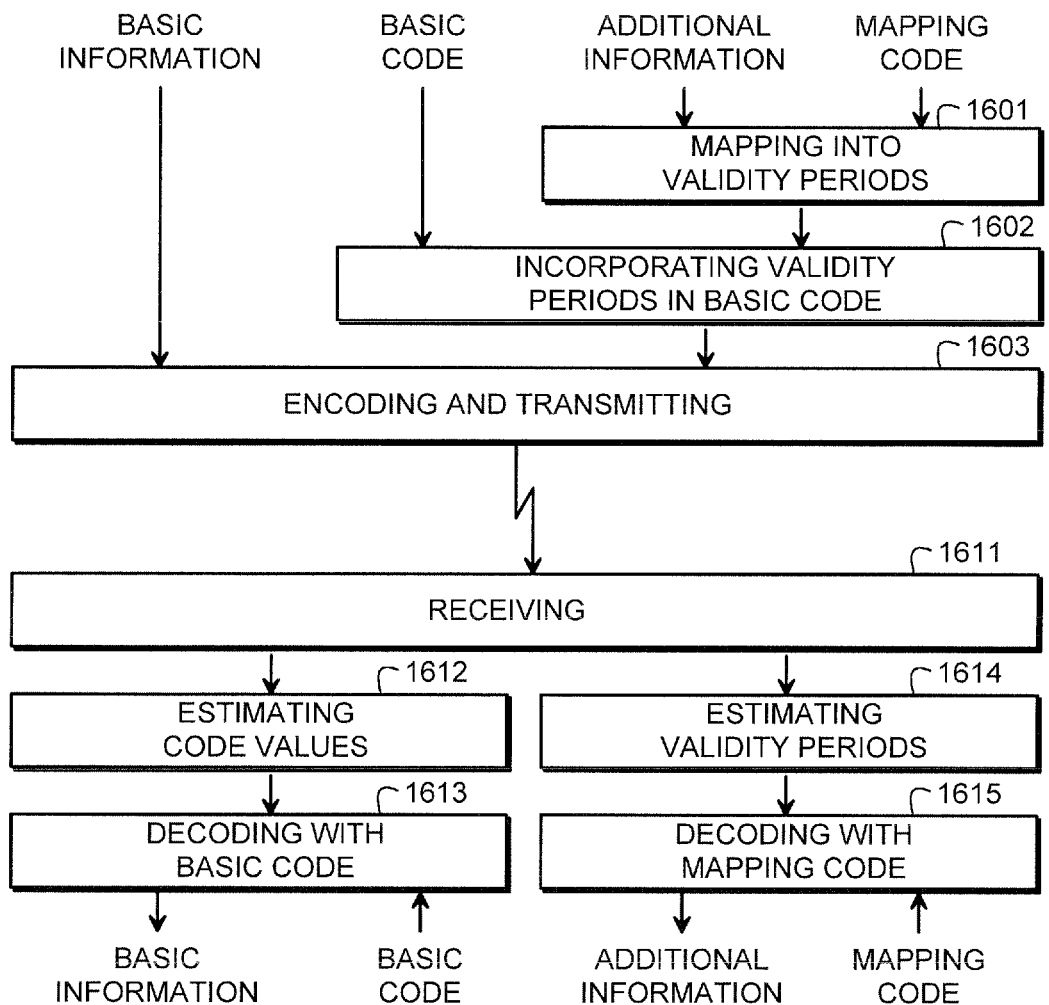
FIG. 16 illustrates a communications application according to an embodiment of the invention.

Above it was already explained how a code according to an embodiment of the invention may be used for encoding a transmission in communications, just like some other digital code that should have advantageous autocorrelation and cross-correlation properties. FIG. 16 illustrates a further development of this principle, in which a code according to an embodiment of the invention is used to convey information so that additional information is carried in the way in which the validity periods of the bauds have been selected.

As illustrated at the top of FIG. 16, there is some basic information and some additional information to be conveyed from a transmitting party to a receiving party. For encoding the information for transmission, a basic code and a mapping code are used. As the basic code, any digital code may be used; for the purpose of illustration we assume that the basic code originally has a constant baud length. The mapping code is a code that defines, how pieces of digital information should be mapped into changes of baud length. Thus, at step 1601, a very particular way of changing baud lengths is selected, so that each selected change in baud length corresponds to a particular piece of the additional information. Without knowing the mapping code it is impossible to find out, what is the information content represented by each change in baud length.

At step 1602 the (originally uniform) baud lengths in the basic code are changed in accordance with the changes defined above in step 1601. As a result, the basic code is turned into a code according to an embodiment of the invention, where each code value has a validity period specific to that code value, there are code values of different validity periods, and each of said validity periods is longer than or equal to a predetermined minimum baud length. For the purposes of code optimality it is advantageous if the mapping of additional information into validity periods has additionally been accomplished so that the validity periods of said code values optimize a covariance matrix specific to the code, but in this case that is not a necessary requirement. At step 1603 the modified basic code is used for encoding the basic information, and the encoded result is transmitted towards the receiving party.

At step 1611 the receiving party receives the transmission that was originally produced by the transmitting party. Decoding proceeds figuratively along two parallel lines. At step 1612 an estimation of the code values as such is performed, without paying attention to their validity periods. We may remember that the changes made to the basic code earlier at step 1602 did not change the code values, but only their validity periods. Therefore what comes out of the code value estimation at step 1612 can be decoded at step 1613 with knowledge of only the basic code. On the other hand, the validity periods are separately estimated at step 1614. The result from step 1614 is exact knowledge (or as exact as possible, taken that distortions of the signal may have occurred on its way from the transmitter to the receiver) of how the validity periods in the received encoded signal differed from a constant baud length. If the receiving party knows the mapping code, it can use it at step 1615 to decode the additional information from the detected validity periods in the received signal.

The principle illustrated in FIG. 16 can be used for example to convey strictly confidential information as additional information. If the changes in validity periods are sufficiently small, an unauthorized party who receives the transmission might simply assume that there has been some jitter in the clock frequency of the encoder at the transmitting end, and omit the variations in validity periods altogether. The probability of the hidden additional information going completely unnoticed by an unauthorized recipient can be enhanced by using some completely plausible information as the basic information, possibly encoded with some assumedly strong but in practise compromised basic code. Even if the unauthorized recipient noticed that not all bauds in the basic code seem to have the same length, without knowing the mapping code the unauthorized recipient can still not decode the actual meaning of the varying validity periods.

Examples explained above are not restrictive. For example, even if a radar has been mostly considered as an example of a remote sensing apparatus, the invention can equally well be applied to other remote sensing systems that use pulsed transmissions, such as sonars and lidars, and hybrid systems that use a combination of various signal forms.

The invention claimed is:

1. A method for generating a code using an electronic device, comprising:

said electronic device defining a finite sequence of code values, for each code value in said finite sequence of code values, defining a validity period specific to that code value, and at least one modulation feature such as at least one of a code-value-specific phase value, a code-value-specific amplitude value, and a code-value-specific frequency value, selecting different validity periods for different code values in said finite sequence of code values, selecting for code values in said finite sequence of code values only validity periods that are longer than or equal to a predetermined minimum baud length, and presenting said finite sequence of code values as an output of the electronic device, generating multiple finite sequences of said code values, which differ from each other in at least one of: code value or values included in the sequence, validity period or periods selected for one or more code values, for each generated finite sequence, calculating a corresponding covariance matrix, comparing said covariance matrices in order to find the most optimal covariance matrix among them, and outputting the finite sequence for use as a code that corresponds to the found most optimal covariance matrix as the optimal code among said generated finite sequences.

* * * * *